(12) United States Patent
Blank

(10) Patent No.: US 11,783,242 B2
(45) Date of Patent: Oct. 10, 2023

(54) ASSET MANAGEMENT AND WORK ORDER APPLICATION SYNCHRONIZATION FOR INTELLIGENT LOCKERS

(71) Applicant: RICOH COMPANY, LTD., Ohta-ku (JP)

(72) Inventor: Richard C. Blank, Crystal Lake, IL (US)

(73) Assignee: Ricoh Company, LTD, Tokyo (JP)

( * ) Notice: Subject to any disclaimer, the term of this patent is extended or adjusted under 35 U.S.C. 154(b) by 104 days.

(21) Appl. No.: 17/324,686

(22) Filed: May 19, 2021

(65) Prior Publication Data

US 2021/0272032 A1    Sep. 2, 2021

Related U.S. Application Data

(63) Continuation of application No. 15/912,846, filed on Mar. 6, 2018, now Pat. No. 11,042,820.

(51) Int. Cl.
*G06Q 10/0631* (2023.01)
*G06Q 10/0639* (2023.01)

(52) U.S. Cl.
CPC . *G06Q 10/06311* (2013.01); *G06Q 10/06398* (2013.01)

(58) Field of Classification Search
None
See application file for complete search history.

(56) References Cited

U.S. PATENT DOCUMENTS

| | | |
|---|---|---|
| 9,141,931 B2 | 9/2015 | Ackerman |
| 2002/0022969 A1 | 2/2002 | Berg |
| 2009/0030941 A1 | 1/2009 | Jacobs |
| 2016/0267579 A1* | 9/2016 | Toya .................. G06F 3/14 |
| 2016/0283475 A1 | 9/2016 | Panchapakesan |
| 2016/0294621 A1 | 10/2016 | Werth |
| 2019/0197809 A1* | 6/2019 | Razzoli ............. G07C 9/00912 |

(Continued)

OTHER PUBLICATIONS

Traka.com, "Tablet and Laptop Lockers", Available: https://www.traka.com/en/site/traka/traka-products/lockers/tablet-and-laptop-lockers, retrieved Feb. 25, 2017, 4 pages.

(Continued)

*Primary Examiner* — Cory W Eskridge

(74) *Attorney, Agent, or Firm* — Hickman Becker Bingham Ledesma LLP

(57) ABSTRACT

A computer-based system for improving a process for synchronizing an asset management system with a work order management system is disclosed. The computer-based system determines whether report data has been received from an asset management system. In response to determining that report data has been received, the report data is parsed to determine one or more keywords that describe an issue reported by the asset management system. The keywords are used to determine whether one or more instructions are available for handling the issue. If the instructions are available, then the instructions are obtained and used to generate one or more messages. The messages are transmitted to a work order management system to cause the work order management system to generate a work order and to dispatch the work order to a service provider to cause the service provider to resolve the issue reported by the asset management system.

20 Claims, 6 Drawing Sheets

(56) References Cited

U.S. PATENT DOCUMENTS

| | | |
|---|---|---|
| 2019/0279130 A1 | 9/2019 | Blank |
| 2019/0286729 A1* | 9/2019 | Ramachandra Iyer ........................ G06F 16/252 |
| 2020/0226538 A1* | 7/2020 | Jung .................. G06Q 30/0621 |

OTHER PUBLICATIONS

Traka.com, "Integrations", Available: https://www.traka.com/en-us/site/traka-usa/usa-integrations, retrieved Nov. 13, 2016, 7 pages.

* cited by examiner

ASSET MANAGEMENT AND WORK ORDER APPLICATION SYNCHRONIZATION FOR INTELLIGENT LOCKERS

BENEFIT CLAIM

This application claims the benefit under 35 U.S.C. § 120 as a Continuation of application Ser. No. 15/912,846, filed Mar. 6, 2018 the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present invention relates to cloud-based mechanisms for synchronizing asset management systems with work order management systems. SUGGESTED GROUP ART UNIT: 2447; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Over the years, many intelligent locker systems have been developed for monitoring and managing physical assets stored in lockers. An intelligent locker system is an electronic system that is configured to manage and lease locker compartments and assets stored in the compartments. Examples of assets that may be stored in the compartments include laptops, smartphones, keys to automobiles, and the like. Some intelligent locker systems may be configured to lease locker compartments to employees and visitors who may store personal belongings or packages in the compartments. Other intelligent locker systems may be configured to manage access to printers, multifunctional peripheral devices, copiers, or scanners installed in libraries, companies, organizations, or schools.

Throughout an operational cycle of an intelligent locker system, the locker compartments may become damaged, and some of the locker assets may become damaged or mislaid. The problems with the lockers and the assets may be reported to a manager of the locker system, and the manager may determine a course of action to resolve the problems. The manger may for example, create a work order, and dispatch the work order to a technician to remedy the problem. The work order may include for example, instructions for repairing a locker compartment, or instructions for replacing a damaged asset with a new asset.

However, in situations when intelligent locker systems are large distributed systems configured to manage many locker facilities deployed in many locations and having thousands of locker compartments, managing work orders and repairs may be difficult and cumbersome. In fact, in some situations, the managing may be virtually impossible.

SUMMARY

In an embodiment, an approach for improving a process for synchronizing asset management systems with work order management systems is described. The approach presented herein is not limited to any particular application of the asset management systems or to any particular application of the work order management systems. The presented mechanisms allow improving the management and utilization of the asset management systems such as intelligent locker systems or similar systems. The terms asset management system and intelligent locker system are used interchangeably throughout the disclosure.

In an embodiment, an approach provides automatic and effective solutions for addressing problems occurring in intelligent locker systems. The approach provides for example, mechanisms for electronically reporting the problems relating to the usage and misusage of the assets, lockers, and locker compartments of the locker systems. Furthermore, the approach provides mechanisms for electronically generating work orders, and dispatching the work orders to service providers and/or agents. Moreover, the approach provides mechanisms for tracking information about the problems, reports, and work orders. Furthermore, the approach provides mechanisms for generating summaries of the usage and misusage of the lockers.

In an embodiment, an improved computer-based system comprises an asset management system, a synchronization system, and a work order management system. An asset management system may be any type of computerized system that is configured to manage, lease, rent, lend, or otherwise provide assets to customers. Examples of asset management systems may include locker systems for leasing locker compartments to customers, and locker systems for providing locker compartments for storing assets to be leased to customers. Other examples of the asset management systems may include computerized asset reservation systems that provide reservation services to customers.

An asset management system may be configured to receive and/or collect report information indicating problems occurring in the asset management system. The report information may include for example, information that a locker compartment in an intelligent locker is malfunctioning, or that an asset stored in the locker compartment has not been timely retrieved from the compartment.

Report information may be submitted to an asset management system either automatically or manually. Automatic submissions of report information may occur when customers of locker systems automatically provide feedback to the locker systems. A customer may provide his feedback using a laptop, a workstation, a smartphone, or a similar device. For example, if the customer notices that the asset is malfunctioning, broken, or missing some parts, then the customer may use a message system, a smartphone, or a computer system to report the problem to the asset management system. The customer may create for example, a notification indicating that the asset is damaged, and transmit the notification to the asset management system.

A customer may provide a brief explanation of the problem using for example, a graphical user interface displayed on the customer's laptop. The customer may select a problem description from a pre-populated list displayed by the user interface. Based on the selected description, the interface may automatically generate report information, and provide the report information to an asset management system.

Automatic submissions of report information may also occur when an asset management system automatically generates the report information. For example, if an asset left in a locker compartment is valuable and cannot be left in the compartment longer than necessary, then the asset management system may automatically report that the asset needs to be picked up from the locker.

Manual submissions of report information may occur when there is for example, a need to perform routine maintenance, surveillance, or investigation. For example, if an act of vandalism is reported to an asset management system, a manager of the system may manually generate a report to indicate that the incident occurred in a locker facility.

In an embodiment, upon receiving report information, an asset management system uses the report information to generate report metadata in a format that a synchronization system can process, and transmits the report metadata to the synchronization system.

A synchronization system may be any type of computerized system that is configured to synchronize communications exchanged between an asset management system and a work order management system. For example, the synchronization system may be configured to receive report data from the asset management system, determine instructions based on the report data, generate messages in a format that the work order management system can process, include the instructions in the messages, and transmit the messages to the work order management system.

A work order management system may be any computerized system that is configured to receive messages and/or instructions for remedying problems that occurred in asset management systems. The work management system may also be configured to identify service providers that may perform the remedial actions to remedy the problems, cause dispatching agents of the service providers to perform the remedial actions, and follow up on the performance of the remedial actions by the agents.

In an embodiment, an asset management system, a synchronization system, and a work order management system are configured to communicate via one or more communications connections established in one or more communications networks. The systems may be implemented in distributed systems executed in cloud-based storage resources, standalone computing devices, network-based computer servers, or any combination of thereof.

Problem reports, work orders, and remedial actions may be tracked and made available upon a request to users who have access to the system. The information about the reports, work orders, and remedial actions may be invaluable to show for example, a chain-of-custody for an asset stored in a locker system, costs of repairs and maintenance of the system, and so forth. The information about the reports, work orders, and remedial actions may be also used to monitor the behaviors and actions of customers, and to track the use and/or misuse of the assets leased to the customers. By making the information available to the intelligent locker systems, the behaviors surrounding the lockers may be monitored and analyzed.

DETAILED DESCRIPTION

Figure 1:
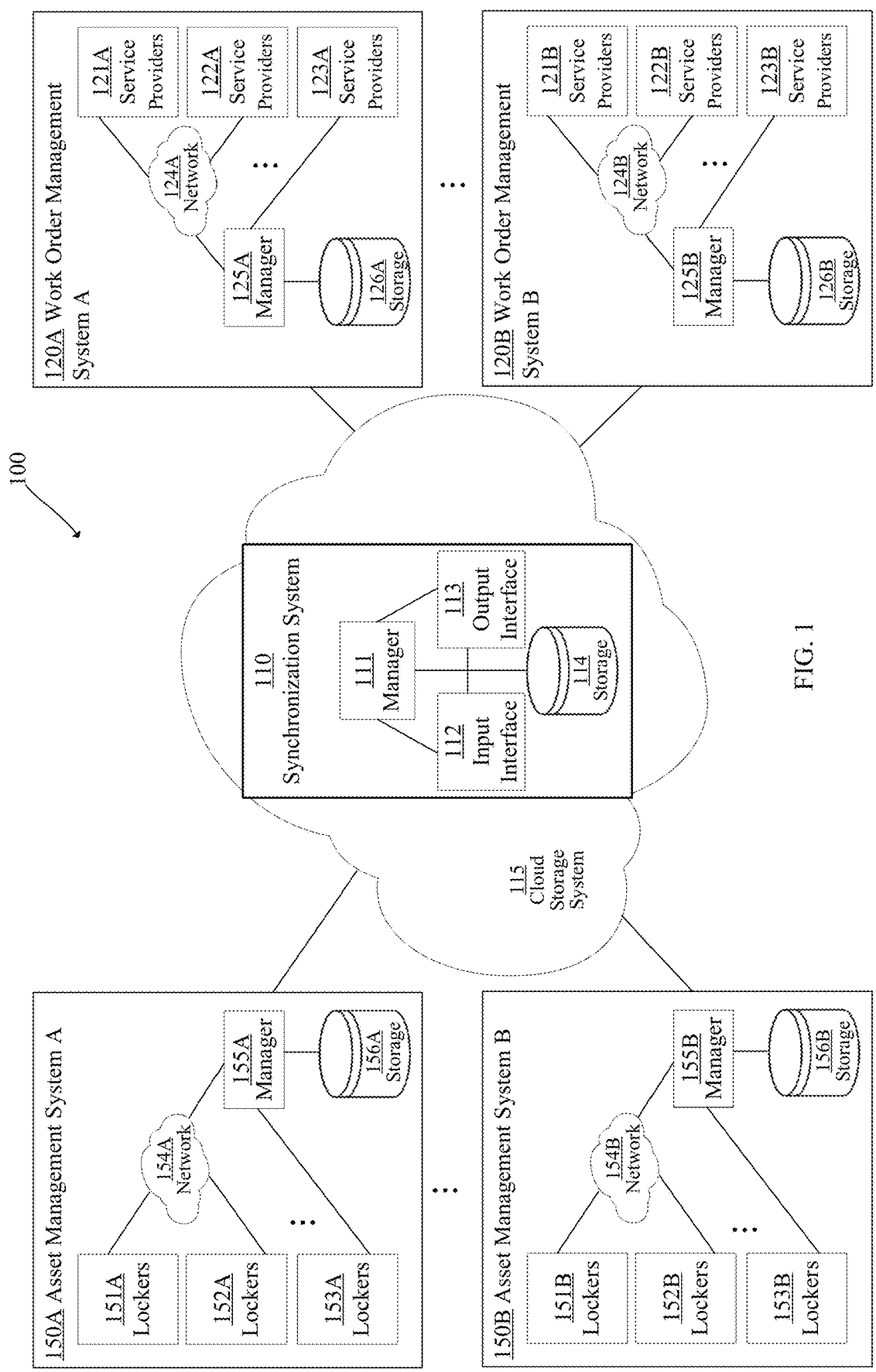
FIG. 1 is a block diagram that depicts an example architecture for asset management and work order application synchronization for intelligent lockers.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

I. OVERVIEW
II. EXAMPLE ARCHITECTURE FOR ASSET MANAGEMENT AND WORK ORDER APPLICATION SYNCHRONIZATION FOR INTELLIGENT LOCKERS
III. EXAMPLE ARCHITECTURE FOR SYNCHRONIZING AN EXAMPLE LOCKER SYSTEM AND AN EXAMPLE WORK ORDER PROCESSOR
   A. EXAMPLE ASSET MANAGEMENT SYSTEM
   B. EXAMPLE SYNCHRONIZATION SYSTEM
   C. EXAMPLE WORK ORDER MANAGEMENT SYSTEM
   D. REPORT DATA
   E. REMEDIAL ACTIONS
IV. EXAMPLE TIME CHART FOR COMMUNICATIONS EXCHANGED BETWEEN AN EXAMPLE LOCKER SYSTEM, AN EXAMPLE SYNCHRONIZATION SYSTEM, AND AN EXAMPLE WORK ORDER PROCESSOR
V EXAMPLE FLOW CHART FOR ASSET MANAGEMENT AND WORK ORDER APPLICATION SYNCHRONIZATION FOR INTELLIGENT LOCKERS
VI. IMPROVEMENTS PROVIDED BY CERTAIN EMBODIMENTS
VII. IMPLEMENTATION MECHANISMS

I. Overview

In an embodiment, an improved method for synchronizing one or more asset management systems with one or more work order management systems is disclosed. An asset management system may be configured to manage, lease, rent, or otherwise provide assets to customers. The asset management system may also be configured to oversee the locker compartments and the assets stored in the compartments. A work order management system may be configured to receive instructions for remedying problems reported by the asset management system, generate work orders, and dispatch the work orders to remedy the problems reported by the asset management systems. The approach is applicable to any types of locker systems and any types of service systems capable of handling problems reported by the locker systems. The approach is not limited to any type of locker systems or to any type of work order systems.

In an embodiment, an improved approach for synchronizing asset management systems with work order management systems includes implementing synchronization mechanisms for facilitating communications exchanged between the asset management systems and the work order management systems.

A synchronization system is a computer-based system configured to facilitate synchronization of communications exchanged between one or more asset management systems and one or more work order management systems. The synchronization system may be implemented in a standalone computing device, a cloud storage system, a mainframe, a workstation, or any other computing device. The synchronization system may include one or more synchronization managers, and one or more distributed interfaces that are configured to facilitate communications between the asset management systems and the work order management system. Examples of distributed interfaces implemented in the synchronization system include input interfaces and output interfaces.

An input interface may be generated by executing a software application on a computing device of a synchronization system. The input interface may be configured to receive and process information. The input interface may be configured to for example, establish, maintain, and close communications connections with an asset management system, receive report data from the asset management system, and provide the received report data to a synchronization manager to identify instructions for remedying problems described in the report data.

A synchronization manager may be generated by executing a software application on a computing device of a synchronization system. The synchronization manager may be configured to receive, from an input interface, report data that includes descriptions of problems occurred in an asset management system. The synchronization manager may also be configured to process the report data, and determine whether instructions for remedying the problems are available. For example, the synchronization manager may receive the report data that indicates that an asset has not been timely returned to a locker compartment of a locker system. Upon receiving the report data, the synchronization manager may parse the data to determine details of the problem, and based on the parsed information, determine whether the synchronization system stores a policy or instructions for handling the problem.

For instance, the synchronization manager may identify one or more keywords in the parsed information, include the keywords in a query, and issue the query against a data repository that stores policies defined for handling problems that may occur in locker systems. If, in response to sending the query, the synchronization manager receives a response, then the synchronization manager may parse the response, identify instructions for remedying the problem, and transmit the instructions to an output interface.

An output interface may be generated by executing a software application on a computing device of a synchronization system. The output interface may be configured to receive instructions for remedying problems described in report data. The output interface may be further configured to generate messages in a format that a work order management system can process, include the instructions in the messages, and transmit the messages to the work order management system.

A work order management system may be configured to receive instructions for remedying problems that occurred in an asset management system. The work order management system may identify service providers that may perform remedial actions for remedying the problems, dispatch agents of the service providers to perform the remedial actions, and follow up on the performance of the remedial actions by the agents.

A synchronization system may track problem reports, work orders, and remedial actions that have been communicated between an asset management system, the synchronization system, and a work order management system. The information about the reports, work orders, and remedial actions may be used to show a chain-of-custody of assets managed by the asset management system, to itemize costs of maintenance and repairs, and to monitor the behaviors and actions of customers of the asset management system.

II. Example Architecture for Asset Management and Work Order Application Synchronization for Intelligent Lockers FIG. 1 is a block diagram that depicts an example architecture 100 for asset management and work order application synchronization for intelligent lockers. Architecture 100 comprises one or more asset management systems 150A-150B; a synchronization system 110; and one or more work order management systems 120A-120B.

Asset management system 150A may be implemented in any type of computer-based system configured to receive and/or collect report information indicating problems occurring in asset management system 150A. Asset management system 150A may include a storage device 156A, one or more managers 155A, and one or more lockers 151A, 152A, 153A configured and managed as intelligent lockers. The lockers may communicate with locker managers 155A directly or indirectly. In the example depicted in FIG. 1, lockers 151A-152A communicate with manger 155A indirectly via one or more communications network 154A, while locker 153A communicates with manager 155A directly. Other arrangements between the lockers and the locker managers may also be implemented.

Asset management system 150B may be implemented in any type of computer-based system configured to receive and/or collect report information indicating problems occurring in asset management system 150B. Asset management system 150B may include a storage device 156B, one or more managers 155B, and one or more lockers 151B, 152B, 153B configured and managed as intelligent lockers. The lockers may communicate with locker managers 155B directly or indirectly. In the example depicted in FIG. 1, lockers 151B-152B communicate with manger 155B indirectly via one or more communications network 154B, while locker 153B communicates with manager 155B directly. Other arrangements between the lockers and the locker managers may also be implemented.

Synchronization system 110 may be implemented as a computer-based system configured to facilitate synchronization of communications exchanged between one or more asset management systems 150A-150B, and one or more work order management systems 120A-120B. Synchronization system 110 may be implemented in a standalone computing device, a cloud storage system, a mainframe, a workstation, or any other computing device. In the example depicted in FIG. 1, synchronization system 110 is implemented in a cloud storage system 115.

Synchronization system 110 may include one or more synchronization managers 111, one or more input interfaces 112, one or more output interfaces 113, and one or more storage systems 114.

Input interface 112 may be generated by executing a software application on a computing device of synchronization system 110. Input interface 112 may be configured to receive report data from asset management systems 150A-150B, and provide the received report data to synchronization manager 111.

Synchronization manager 111 may be generated by executing a software application on a computing device of synchronization system 110. Synchronization manager 111 may be configured to receive, from input interface 112, report data, or metadata, that includes descriptions of problems occurred in asset management systems 150A-150B. Synchronization manager 111 may be configured to process the received data, and determine whether instructions for remedying the problems are available. If the instructions are available, then synchronization manager 111 may obtain the instructions, and provide the instructions to output interface 113.

Output interface 113 may be generated by executing a software application on a computing device of synchronization system 110. Output interface 113 may be configured to receive, from synchronization 111 manager, instructions for remedying problems described in the report data. Output interface 113 may be further configured to generate messages in a format that work order management system 120A/120B can process, include the instructions in the messages, and transmit the messages to work order management system 120A/120B.

Work order management system 120A may be implemented in any type of computer-based system configured to receive messages including instructions for remedying problems occurred in asset management system 150A/150B. Work order management system 120A may include one or more managers 125A, and one or more service providers 121A, 122A, 123A. Manager 125A may be configured to receive the messages, parse the messages to extract the instructions, determine work orders based on the instructions, and dispatch the work orders to service providers 121A, 122A, and/or 123A. The manager may communicate with the service providers directly or indirectly. In the example depicted in FIG. 1, manager 125A communicates directly with service provider 123A, and indirectly with service providers 121A-122A via a network 124A. Other arrangements between the manager and service providers may also be implemented.

Work order management system 120B may be implemented in any type of computer-based system configured to receive messages including instructions for remedying problems occurred in asset management system 150A/150B. Work order management system 120B may include one or more managers 125B, and one or more service providers 121B, 122B, 123B. Manager 125B may be configured to receive the messages, parse the messages to extract the instructions, determine work orders based on the instructions, and dispatch the work orders to service providers 121B, 122B, and/or 123B. The manager may communicate with the service providers directly or indirectly. In the example depicted in FIG. 1, manager 125B communicates directly with service provider 123B, and indirectly with service providers 121B-122B via a network 124B. Other arrangements between the manager and service providers may also be implemented.

Figure 2:
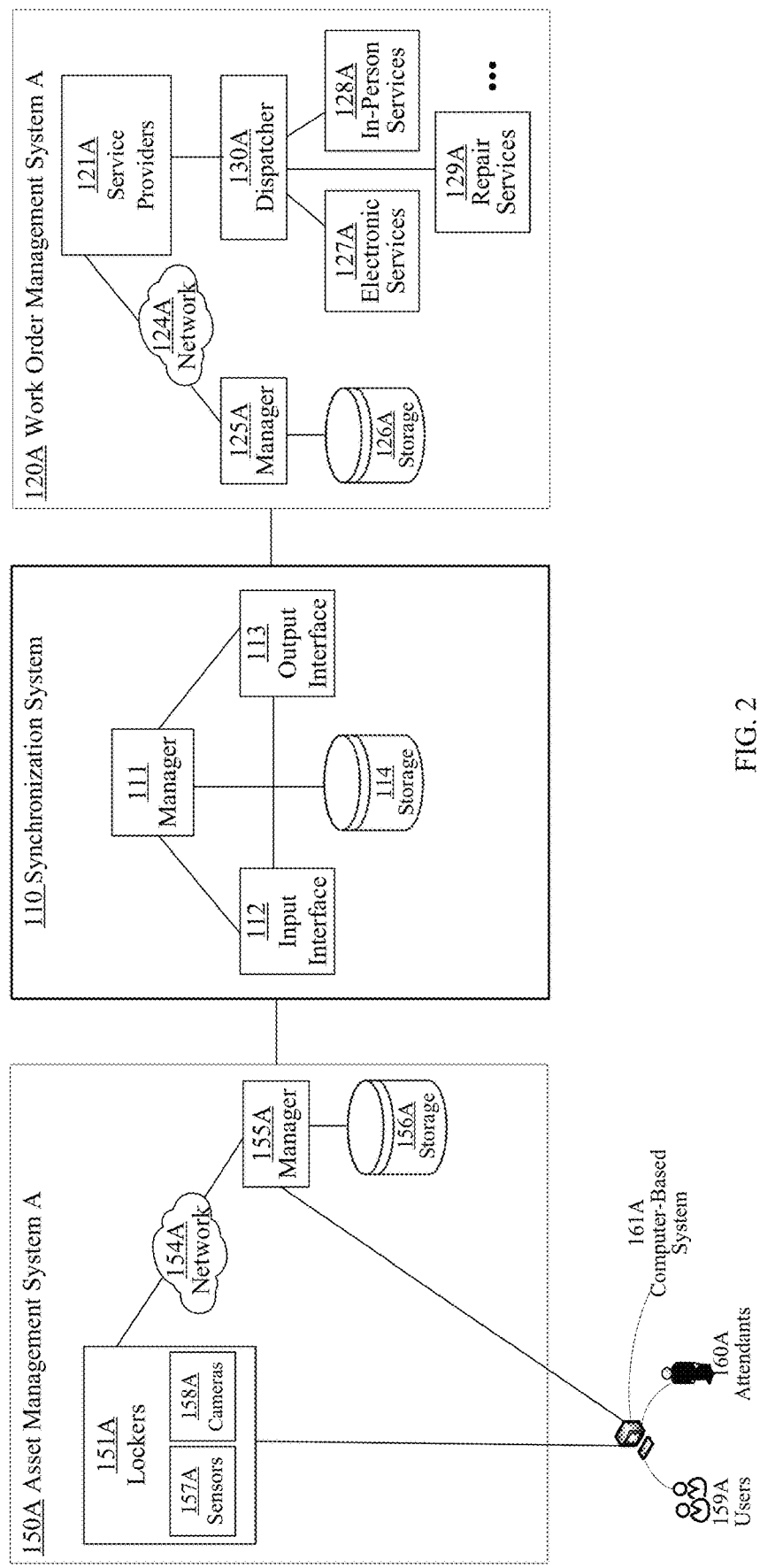
FIG. 2 is a block diagram that depicts an example architecture for synchronizing an example asset management system with an example work order management system.

III. Example Architecture for Synchronizing an Example Locker System and an Example Work Order Processor FIG. 2 is a block diagram that depicts an example architecture for synchronizing an example asset management system 150A with an example work order management system 120A. The example architecture comprises asset management systems 150A, synchronization system 110, and work order management system 120A. Asset management system 150A, synchronization system 110 and work order management system 120A depicted in FIG. 2 correspond to the systems described in FIG. 1.

A. Example Asset Management System

Asset management system 150A may be any type of computerized system that is configured to manage, lease, rent, lend, or otherwise provide assets to customers. For example, asset management system 150A may be configured to manage a distributed network of intelligent lockers that rent locker compartments and assets to customers. The locker compartments may be used to store for example, keys to automobiles, motorcycles, or trucks that the customers may rent. The locker compartments may be also used to store ice-skates, skis, ski boards, laptops, tablets, smartphones, headphones, play stations, recorders, video players, and the like. Asset management system 150A may be configured to receive requests for reserving the assets, manage the requests and the assets, and determine whether any problems occurred with the locker compartments, the stored items, and/or the locker system itself.

Furthermore, asset management system 150A may provide locker compartments that may be leased to customers. The locker compartments may be used by the customers to store personal belongings, and may be available at train stations, bus stations, airports, hotels, museums, libraries, recreation areas, sport facilities, and others. Asset management system 150A may be configured to receive requests for reserving the compartments, manage the requests, and determine whether any problems occurred with the locker compartments, and/or the reservations.

Moreover, asset management system 150A may be configured to manage a computerized asset reservation system that provides reservations services to customers. The reservation system may be used to reserve conference rooms, computer workstations, printing devices, copiers, fax machines, scanners, and other devices that may be shared between employees, contractors, students, and/or public. The computerized asset reservation system may be configured to receive request for reserving the assets, manage the request and the assets, and determine whether any problems occurred with the reservations, the assets, and/or the reservation system.

Furthermore, asset management system 150A may be configured to manage a computer asset reservation system that provides reservations for summer homes, vacation accommodations, rooms, and the like. The reservation system may be configured to receive requests for reserving the homes and/or rooms, manage the requests, and determine whether any problems occurred with the reservations, and the homes/rooms.

Asset management system 150A may receive requests and feedback from customers 159A via a computer-based system 161A. Computer-based system 161A may be also used by attendants 160A who can provide report information related to the status of the locker compartments, and the assets stored and/or returned to the compartments.

Asset management system 150A may be also equipped with sensors 157A, cameras 158A, and other devices that can provide feedback about the status of locker compartments, and assets stored in the locker compartments.

B. Example Synchronization System

Synchronization system 110, also referred to as a computer-based synchronization system, is a computer system configured to synchronize communications exchanged between asset management system 150A and work order management system 120A. Synchronization system 110 may be configured in a cloud storage system, a standalone computer server, a mainframe, a workstation, a distributed network of computer workstations, and the like.

In an embodiment, synchronization system 110 receives report data from manager 155A of asset management system 150A. Report data may be received by input interface 112 that is configured or implemented in synchronization system 110.

Input interface 112 may be configured to receive report data, or metadata, from asset management system 150A indicating that a problem occurred in asset management system 150A. If the data is expressed in a format that is specific to asset management system 150A, but that cannot be understood by synchronization system 110, then input interface 112 may translate the data from the format specific to asset management system 150A to report data represented in a format that synchronization system 110 can process.

In an embodiment, in response to receiving report data, manger 111 parses the report data to determine one or more keywords that describe an issue reported in the report data. Based on the one or more keywords, manager 111 may determine whether one or more instructions are available for handling the issue described by the one or more keywords.

If the instructions are not available, then manger 111 may generate a notification indicating that the instructions for handling the problem is unavailable, and transmit the notification to asset management system 150A.

However, if the instructions are available, then manager 111 may obtain or retrieve the instructions, generate one or more messages in a format that work order management system 120A can process, include the instructions in the messages, and provide the messages to output interface 113.

Output interface 113 may be configured to receive messages from manager 111. The messages may include instructions for remedying a problem reported by asset management system 150A. Output interface 113 may transmit the messages to work order management system 120A.

C. Example Work Order Management System

In an embodiment, work order management system 120A includes one or more managers 125A, one or more storage devices 126A, one or more communications networks 124A, one or more service providers 121A, and one or more dispatchers 130A. Dispatchers 130A may communicate with one or more electronic services 127A, one or more in-person services 128A, one or more repair services 129A, and the like.

Work order management system 120A may be any computerized system that is configured to receive messages containing instructions for remedying problems that occurred in asset management system 150A. Work order management system 120A may also be configured to identify service providers that may perform remedial actions for remedying the problems, cause dispatching agents of the service providers to perform the remedial actions, and follow up on the performance of the remedial actions by the agents.

In an embodiment, upon receiving one or more messages containing instructions for remedying a problem, work order management system 120A parses the messages and the instructions to determine a service provider that is configured to resolve the problem reported by asset management system 150A. Work order management system 120A may also determine one or more remedial actions to be performed to resolve the problem. For example, work order management system 120A may determine whether service provider 121A is available to perform the remedial actions.

In response to determining that service provider 121A is available to perform the remedial actions, work order management system 120A may generate a work order, include descriptions of the remedial actions in the work order, and transmit the work order to service provider 121A to cause service provider 121A to communicate the work order to dispatcher 130. Dispatcher 130 may contact for example, repair services 129A to execute the remedial actions to resolve the problem reported by asset management system 120A.

Figure 3:
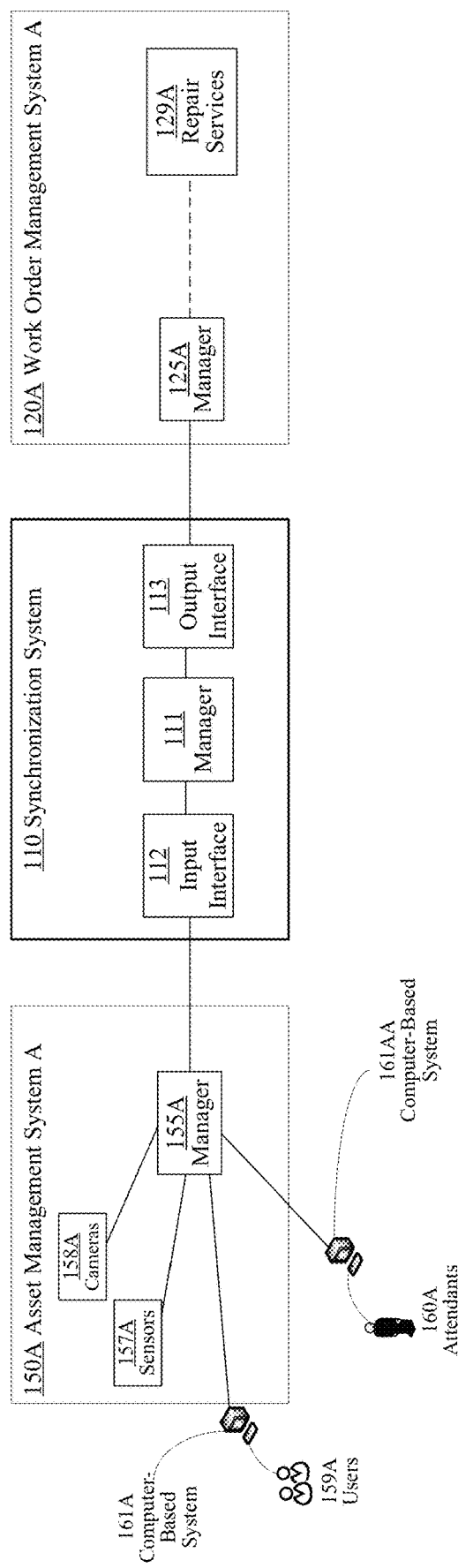
FIG. 3 is a block diagram that depicts an example architecture for synchronizing an example asset management system with an example work order management system.

FIG. 3 is a block diagram that depicts an example architecture for synchronizing an example asset management system 150A with an example work order management system 120A. The example architecture comprises asset management systems 150A, synchronization system 110, and work order management system 120A. Asset management system 150A, synchronization system 110, and work order management system 120A depicted in FIG. 3 correspond to the systems described in FIG. 1 and FIG. 2.

Asset management system 150A may receive and collect report information indicating problems occurring in asset management system 150A. The report information may be provided from computer-based system 161A via which customers 159A may provide their comments pertaining to the status of locker compartments, assets, and so forth.

For example, upon arriving at a locker facility of asset management system 150A and retrieving an asset from a locker compartment, a customer may notice that the asset is damaged. The customer may use a kiosk that is part of computer-based system 161A, and enter report information to describe the problem with the asset. To enter the report information, the customer may launch an application executing in the kiosk, and follow up the menus displayed by the application on a display screen of the kiosk. The menus may be arranged as a sequence of webpages, where each page may display a question and multiple answers to the question. The customer may select one or more answers to the questions to describe the problem with the asset. The selected answers may be used to generate the report information and may be communicated to manger 155A of asset management system 150A.

Report information may also be provided to asset management system 150A from computer-based system 161AA. Computer-based system 161AA may be used by attendants 160A to provide report information related to the status of the locker compartments, the assets stored and/or returned to the compartments, and the like. For example, attendants or security guards may periodically inspect the lockers and compartments, and upon determining that some lockers or compartments are malfunctioning or damaged, the attendants may access computer-based system 161AA, and enter report information to describe the problem with the lockers or compartments. To enter the report information, the attendants may launch an application on computer-based system 161AA, and follow up the menus displayed by the application on a display screen of computer-based system 161AA. The menus may be arranged similarly to the menus displayed by a kiosk of computer-based system 161A. Alternatively, the attendants may use the kiosk of computer-based system 161A.

Report information may also be provided to asset management system 150A from sensors 157A, cameras 158A, and other devices that can provide feedback about the status of locker compartments, the status of assets stored in the compartments, and/or indications of whether locker compartments are empty. Sensors 157A and cameras 158A may be installed in individual locker compartments, or in groups of individual locker compartments.

Sensors 157A may include weight sensors, optical sensors, temperature sensors, and so forth. A weight sensor may be used for example, to detect whether a weight of an object stored in a locker compartment changed from some positive value to a zero value. If the sensor detects the change, then the sensor may generate report information indicating that an object stored in the compartment has been removed from the compartment. An optical sensor may be used for example, to determine a color of an object placed in a locker compartment. If an object stored in a compartment should be a package wrapped in a brown paper, but the optical sensor detects a red object in the compartment, then the sensor may generate report information indicating that a wrong object was placed in the compartment.

Cameras 158A may include digital cameras, near-infrared (NIR) cameras, and so forth. Cameras 158A may be used to detect whether a door of a locker compartment is open, closed, partially open, damaged, and so forth. For example, upon detecting that a door of a locker compartment is open for more than 10 minutes, camera 158 may generate report information indicating that the door is open too long or that perhaps a customer forgot to close the door of the compartment.

Report information may be converted, or translated, to report metadata by manager 155A, and transmitted to interface 112 of synchronization system 110. Interface 112 may convert, translate the report metadata to report data that manger 111 of synchronization system 110 can process. Interface 112 may provide the report data to manager 111 of synchronization system 110.

D. Report Data

Report data is any type of data that may be transmitted to manager 111 of synchronization system 110 to indicate that a problem occurred in asset management system 150A. Report data that was originated in an intelligent locker may include one or more of: a report indicating that an asset was not timely returned to the locker, a report indicating that an asset was not timely retrieved from the locker, a report indicating that an asset was returned to the locker in an unsatisfactory condition, a report indicating that a valuable asset was not retrieved from the locker, a report indicating that an item returned to the locker is not an asset that is expected to be returned to the locker, a report indicating that the locker has been damaged, a report indicating that several unsuccessful attempts have been made to open the locker, a report indicating that a locking mechanism of the locker has been tampered with, or a report indicating that the locker has been opened for a time period longer than expected.

Upon receiving report data, manager 111 may process the received report data, and determine whether instructions for remedial actions to remedy the reported problems are available. For example, manager 111 may receive the report data that indicates that an asset returned to a locker compartment is damaged. Upon receiving the report data, manager 111 may parse the data, identify one or more keywords in the parsed information, include the keywords in a query, and issue the query against a data repository that stores various policies defined for handling locker-related problems. If, in response to sending the query, manager 111 receives a response with an identification of a policy, then manager 111 may retrieve the policy from the data repository, and identify instructions set forth in the policy for handling the problem. Furthermore, manager 111 may generate one or more messages expressed in a format that work order management system 120A can process, include the instructions in the messages, and transmit the messages to output interface 113.

Output interface 113 may receive the messages, and communicate the messages to manager 125A of work order management system 120A.

Upon receiving the messages, manager 125A may parse the messages, extract the instructions from the messages, and determine one or more remedial actions based on the instructions.

E. Remedial Actions

Remedial actions are any type of actions that work order management system 120A may generate based on instructions received from synchronization system 110 and to remedy a problem reported by asset management system 150A. Synchronization system 110 may communicate the remedial actions to one or more service providers that are able to either execute computer instructions of the remedial actions on computer resources of asset management system 150A to remedy the reported problem, or dispatch work orders to send a person (an agent) to perform the remedial actions to remedy the reported problem.

Examples of remedial actions executed by a service provider, or an agent, to resolve a problem occurred in an intelligent locker include: a remedial action to report that an asset was not timely returned to the locker, a remedial action to report that an asset was not timely retrieved from the locker, a remedial action to retrieve an asset that was returned to the locker in an unsatisfactory condition, a remedial action to retrieve a valuable asset from the locker, a remedial action to retrieve an item returned to the locker that is not an asset that is expected to be returned to the locker, a remedial action to repair the locker that has been damaged, a remedial action to inspect the locker after several unsuccessful attempts have been made to open the locker, a remedial action to repair a locking mechanism of the locker that has been tampered with, or a remedial action to lock the locker that has been opened for a time period longer than expected.

Figure 4:
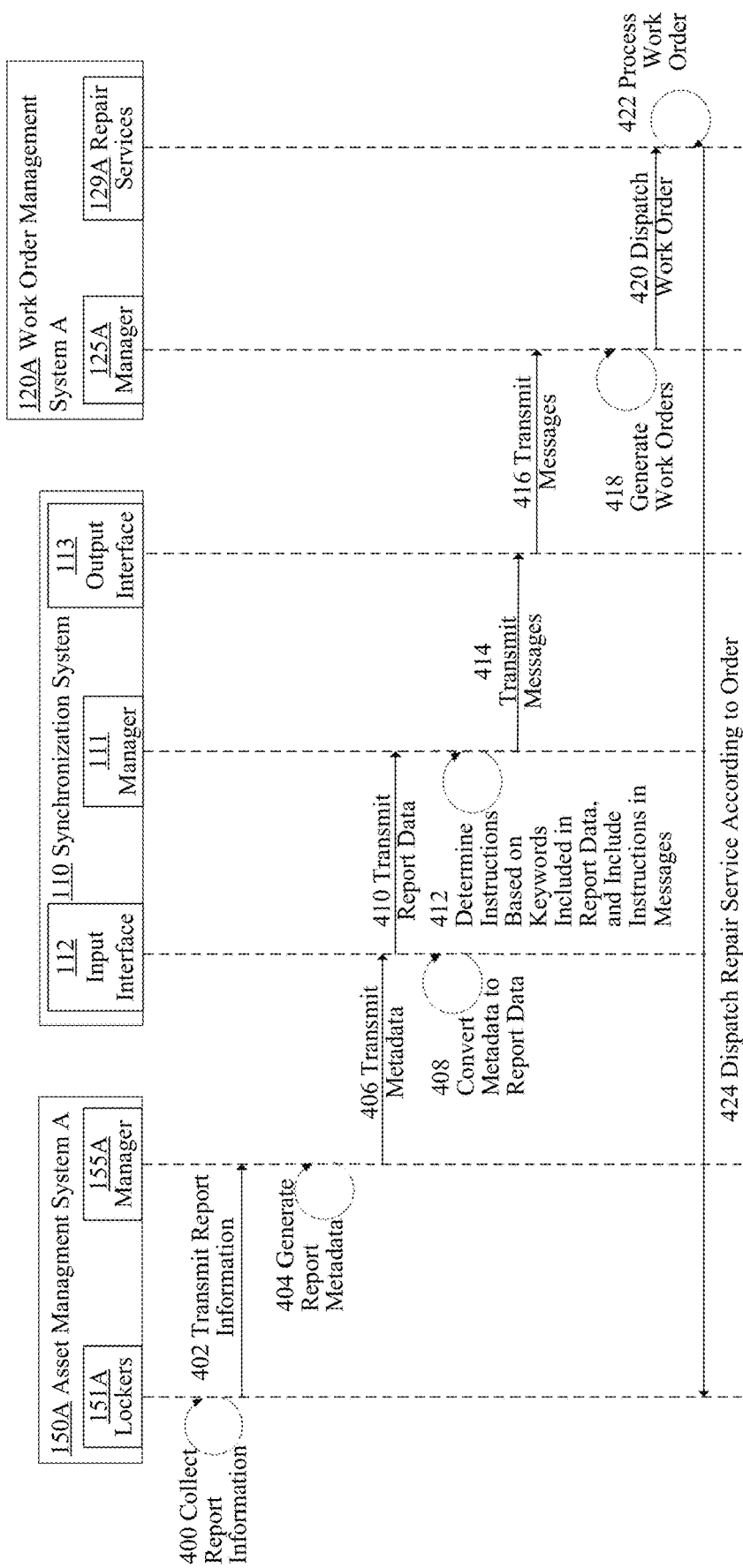
FIG. 4 depicts an example message ladder diagram for communications exchanged between an example asset management system, an example synchronization system, and an example work order management system.

IV. Example Time Chart for Communications Exchanged Between an Example Locker System, an Example Synchronization System, and an Example Work Order Processor FIG. 4 depicts an example message ladder diagram for communications exchanged between an example asset management system 150A, an example synchronization system 110, and an example work order management system 120A. The depicted time chart illustrates an improved process for synchronizing asset management system 150A with work order management system 120A using synchronization system 110.

The process may start when one or more lockers 151A of asset management system 150A detect or receive indications of problems occurring in the lockers or problems with assets stored in the lockers. The received information is referred to herein as report information, and was described in detail above. The problems may pertain to for example, malfunctioning of a locker compartment, deterioration of an asset stored in the compartment, mislaying of an asset that should have been stored in the locker, and so forth. The report information may be provided by users, customers, security guides, or other individuals who detected the problems. The report information may be collected 400, and transmitted 402 to manager 155A of asset management system 150A.

Manager 155A may consolidate the report information, translate 404 the report information to report metadata, and transmit 406 the report metadata to synchronization system 110, or more specifically, to input interface 112.

Upon receiving the report metadata, input interface 112 may process the received metadata. For example, input interface 112 may convert 408 the metadata to report data that is expressed in a format that manager 111 can process. Then, input interface 112 may transmit 410 the report data to manager 111.

Manager 111 may parse the received report data, identify, in the parsed information, one or more keywords that describe the problem, and based on the keywords, generate 412 instructions for remedying the problem. Furthermore, manager 111 may generate one or more messages that are expressed in a format that work order management system 120A can process, include the instructions in the messages, and transmit 414 the instructions to output interface 113, which in turn may transmit 416 the messages to work order management system 120A.

Upon receiving the messages, manager 125A of work order management system 120A may analyze the messages and the instructions included in the messages, and generate 418 one or more work orders according to the instructions. Manager 125A may dispatch 420 the work orders to repair services 129A to process the work orders. This may include causing repair services 129A to send 424 for example, an agent to resolve the problem with locker 151A.

Figure 5:
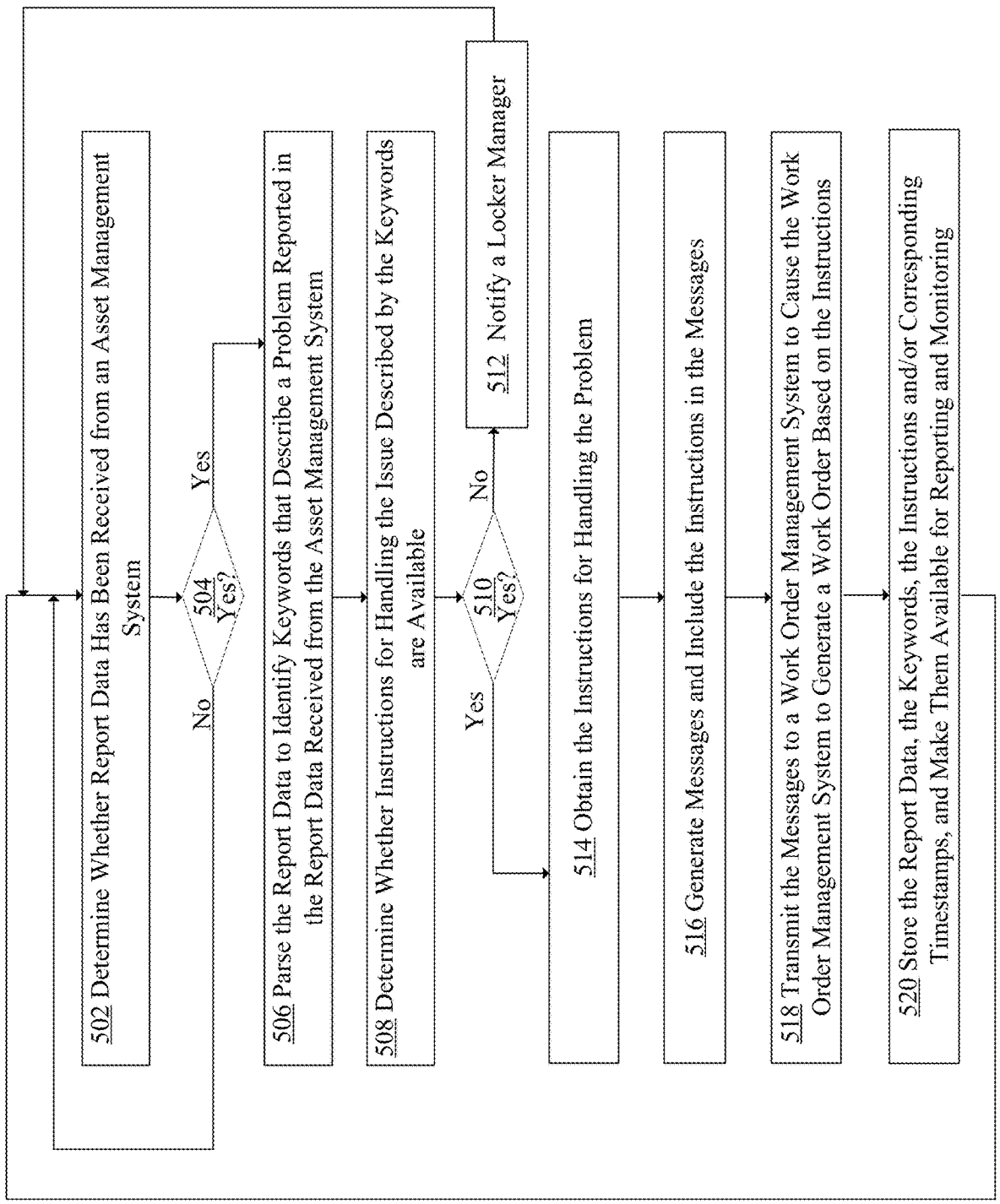
FIG. 5 depicts an example flow chart for asset management and work order application synchronization for intelligent lockers.

V. Example Flow Chart for Asset Management and Work Order Application Synchronization for Intelligent Lockers FIG. 5 depicts an example flow chart for asset management and work order application synchronization for intelligent lockers. Steps depicted in FIG. 5 may be performed by synchronization system 110, or any other system that is configured to synchronize asset management system 150A with work order management system 120A. The improved process for synchronizing asset management system 150A with work order management system 120A starts in step 502.

In step 502, synchronization system 110 determines whether report data has been received from asset management system 150A. The report data is data that indicates that a problem occurred in asset management system 150A. The problem may pertain to for example, malfunctioning of a locker compartment, deterioration of an asset stored in a locker compartment, mislaying of an asset that should have been in a locker, and so forth. The report data may be provided by users, customers, security guards, attendants, or other individuals who detected the problem.

In step 504, synchronization system 110 tests whether the report data has been received from asset management system 150A. If the report data has been received, then step 506 is performed. Otherwise, step 502 is repeated.

In step 506, synchronization system 110 parses the received report data to identify one or more keywords that describe the problem described in the report data. The keywords may include for example, words such as: damaged, malfunctioning, dented, scratched, and so forth.

In step 508, synchronization system 110 uses the keywords to generate a query, and issues the query against a data repository used by synchronization system 110 to store policies and instructions for handling problems reported by asset management system 150A.

In step 510, synchronization system 110 tests whether a response to the query has been received. If the response has been received, synchronization system 110 tests whether the response includes one or more instructions for remedying the reported problem. If the instructions are included, then step 514 is performed. Otherwise, step 512 is performed, in which synchronization system 110 generates a notification to indicate that synchronization system 110 was unable to determine instructions for remedying the problem.

In step 514, synchronization system 110 obtains instructions for remedying the reported problem. This may include retrieving the identified instructions from a data repository accessible to synchronization system 110, downloading the instructions from a cloud storage system accessible to synchronization system 110, or invoking and executing an agent application to provide the instructions to synchronization system 110.

In step 516, synchronization system 110 generates one or more messages that are expressed in a format that work order management system 120A can process. Also in this step, synchronization system 110 includes the instructions in the messages.

In step 518, synchronization system 110 transmits the messages to work order management system 120A to cause work order management system 120A to parse the messages and the instructions included in the messages, and use the instructions to determine one or more work orders and/or one or more remedial actions for remedying the reported problem.

Upon receiving the messages, work order management system 120A may parse the messages and the instructions included in the messages, and, based on the instructions, determine work orders and/or remedial actions. Then, work order management system 120A may dispatch the work orders and/or the remedial actions to repair services or service providers. For example, work order management system 120A may dispatch a work order to a repair service to cause the repair service to send an agent to a locker facility to resolve the problem with a locker compartment.

In step 520, synchronization system 110 generates one or more records for the reported problem. In this step, synchronization system 110 may for example, generate records for storing information about the problem reported by asset management system 150A. In a record, synchronization system 110 may include report data received from asset management system 150A, instructions that synchronization system 110 generated or obtained to address the problem, and any additional information that may be helpful to track the problem. For example, synchronization system 110 may add a timestamp indicating the time when the report data was received, a timestamp indicating the time when the messages with the instructions were generated, a timestamp indicating the time when the messages were transmitted to synchronization system 110, and any notifications that were either transmitted to synchronization system 110 or from synchronization system 110. The record may be stored in a data repository, a cloud-based storage system, or any other storage device accessible to synchronization system 110.

In an embodiment, records generated for reported problems may be accessed and updated by asset management system 150A and/or work order management system 120A. For example, asset management system 150A may update a record pertaining to a problem by adding a timestamp indicating the time when the problem was detected, identifications of the customers who reported the problem, a timestamp indicating the time when report data was generated. Work order management system 120A may update the record by adding a timestamp indicating the time when messages containing instructions for remedying the problem were received by work order management system 120A, a timestamp indicating the time when the remedial actions were generated, and a timestamp indicating the time when the work orders and/or the remedial actions were dispatched to a service provider.

Records generated for reported problems may be searched, tracked and monitored. The records may be used to generate statistical reports that may be invaluable to show for example, a chain-of-custody for the assets, costs of repairs and maintenance, and so forth. The records may be used to monitor the behaviors and actions of customers, and to track the use and the misuse of the assets leased by asset management system 150A.

VI. Improvements Provided by Certain Embodiments

In an embodiment, an improved method is presented for synchronizing intelligent locker systems with work order management systems. The approach allows for example, detecting problems occurring in the intelligent locker systems, automatically determining remedial actions to remedy the detected problems, and automatically arranging for performing the remedial actions in the locker systems. The improved method is efficient and effective in any type of the intelligent locker facility. Even if the locker facility is large and distributed, the method allows improving the way that the locker compartments and the assets are managed and maintained.

In an embodiment, an improved method presented herein allows receiving report data indicating problems that occurred in an asset management system, and automatically determine a course of action to resolve the problems. This may include automatically creating work orders, and automatically dispatching the work order to service providers for execution. The work orders may include for example, remedial actions for repairing locker compartments, or instructions for replacing damaged assets stored the compartment.

In an embodiment, an improved method is applicable to any distributed system configured to manage locker facilities deployed in many locations and having thousands of locker compartments. The improved method allows managing work orders and repairs efficiently and effectively, reducing computational resources, storage resources, network traffic, and time.

In an embodiment, an approach allows generating, storing, and monitoring report data, work orders, and remedial actions generated in response to detecting problems in an asset management system. Records storing the report data, work orders, and remedial actions may be searched, sorted, and used to generate summaries and charts providing overviews of behavioral characteristics of customers of the intelligent locker systems.

VII. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
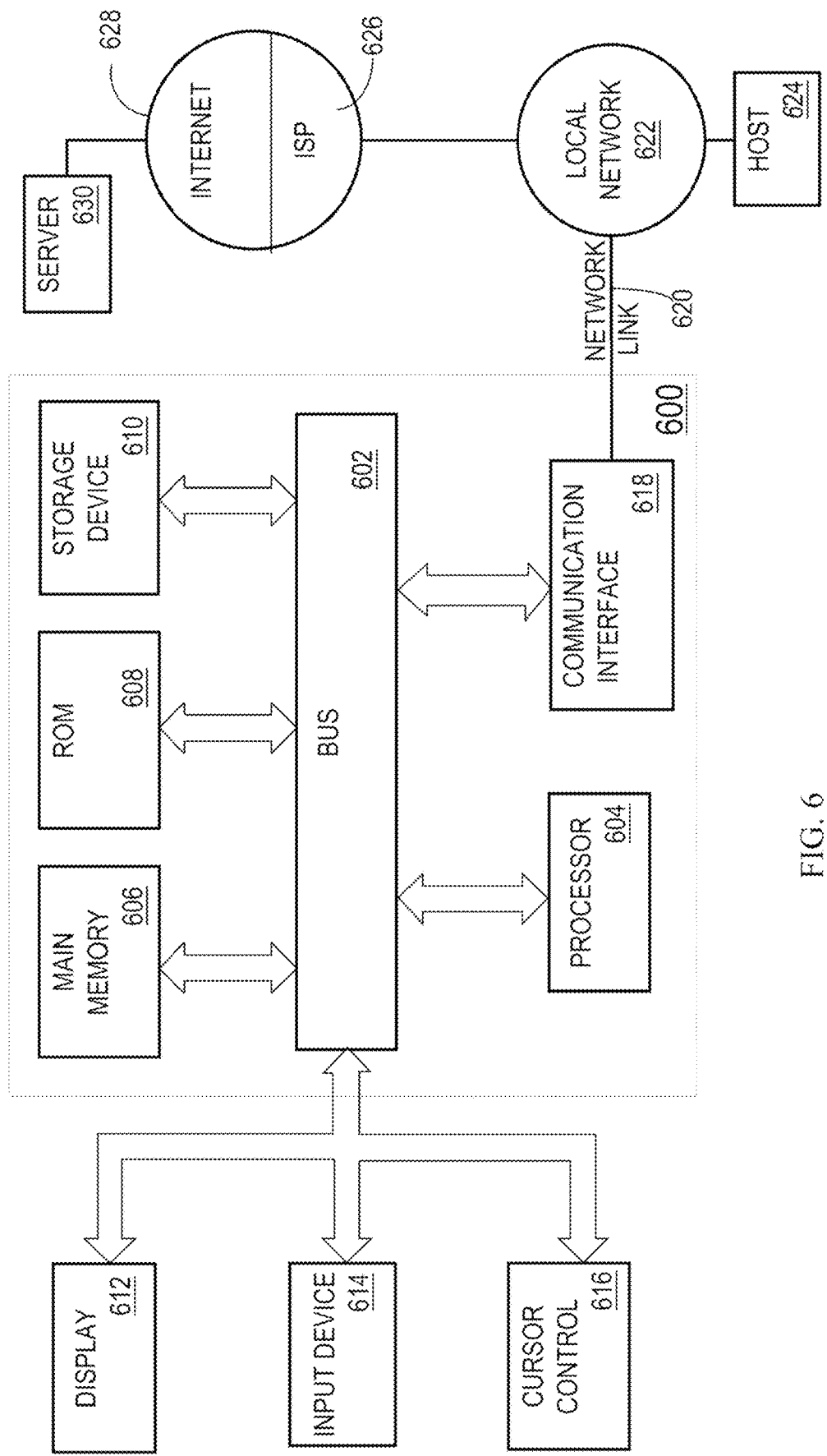
FIG. 6 is a block diagram that depicts an example computer system upon which embodiments may be implemented.

FIG. 6 is a block diagram that depicts an example computer system upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the approach. Thus, embodiments are not limited to any specific combination of hardware circuitry and software.

The term "computer-readable medium" as used herein refers to any medium that participates in providing data that causes a computer to operation in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An asset management system comprising:
   a locker including a plurality of locker compartments;
   one or more processors; and
   one or more memories storing instruction which, when executed by the one or more processors, cause:
   receiving a request for renting or sharing an asset stored in a locker compartment of the plurality of locker compartments;
   displaying, on a display of a computer-based system communicatively coupled with a locker, a menu for entering report information pertaining to a problem with the asset; and
   in response to receiving the report information, transmitting, to a synchronization system, report data obtained from the report information to cause the synchronization system to:
   convert the report data obtained from the report information into manager report data that is in a format that a manager of the synchronization system can process;
   store the manager report data in a database in the format that the manager of the synchronization system can process;
   determine, based on the report data, instructions for solving the problem;
   automatically generate, by the synchronization system, one or more messages and including the instructions for handling the problem with the asset;
   automatically transmit the one or more messages, from the synchronization system to a plurality of work order management systems over one or more computer networks, so that each of the work order management systems has access to the one or more messages.

2. The asset management system of claim 1, storing additional instructions which, when executed by the one or more processors, cause:
   receiving a request for reserving a locker compartment of the plurality of locker compartments for a temporary use; and
   wherein the computer-based system accepts, via the display, report information pertaining to a problem with the locker compartment.

3. The asset management system of claim 1,
   wherein the computer-based system is configured as a kiosk;
   wherein the report information is entered via the display of the kiosk.

4. The asset management system of claim 3, wherein the report information is entered by selecting, for each question of one or more questions displayed in the display of the kiosk, one or more answers displayed in the display of the kiosk.

5. The asset management system of claim 1,
   wherein the menu is generated using a graphical user interface configured to display a sequence of webpages.

6. The asset management system of claim 1, further comprising a locker manager;

wherein the locker manager generates report metadata from the report information received from the computer-based system and transmits the report metadata to the synchronization system.

7. The asset management system of claim 6, further comprising one or more sensors or one or more cameras implemented in the locker;
wherein the locker receives sensor data from one or more sensors or camera data from one or more cameras and transmits the sensor data or the camera data to the locker manager along with the report information.

8. A method comprising:
receiving a request for renting or sharing an asset stored in a locker compartment of a plurality of locker compartments of a locker;
displaying, on a display of a computer-based system communicatively coupled with the locker, a menu for entering report information pertaining to a problem with the asset; and
in response to receiving the report information, transmitting, to a synchronization system, report data obtained from the report information to cause the synchronization system to:
convert the report data obtained from the report information into manager report data that is in a format that a manager of the synchronization system can process;
store the manager report data in a database in the format that the manager of the synchronization system can process;
determine, based on the report data, instructions for solving the problem;
automatically generate, by the synchronization system, one or more messages and including the instructions for handling the problem with the asset;
automatically transmit the one or more messages, from the synchronization system to a plurality of work order management systems over one or more computer networks, so that each of the work order management systems has access to the one or more messages.

9. The method of claim 8, further comprising:
receiving a request for reserving a locker compartment of the plurality of locker compartments for a temporary use; and
wherein the computer-based system accepts, via the display, report information pertaining to a problem with the locker compartment.

10. The method of claim 8,
wherein the computer-based system is configured as a kiosk; and
wherein the report information is entered via the display of the kiosk.

11. The method of claim 10, wherein the report information is entered by selecting, for each question of one or more questions displayed in the display of the kiosk, one or more answers displayed in the display of the kiosk.

12. The method of claim 8,
wherein the menu is generated using a graphical user interface configured to display a sequence of webpages.

13. The method of claim 8, wherein the locker further comprises a locker manager; wherein the locker manager generates report metadata from the report information received from the computer-based system and transmits the report metadata to the synchronization system.

14. The method of claim 13, wherein the locker further comprises one or more sensors or one or more cameras implemented in the locker; and
wherein the locker receives sensor data from one or more sensors or camera data from one or more cameras and transmits the sensor data or the camera data to the locker manager along with the report information.

15. A non-transitory computer readable storage media storing one or more instructions which, when executed by one or more processors, cause the one or more processors to perform:
receiving a request for renting or sharing an asset stored in a locker compartment of a plurality of locker compartments of a locker;
displaying, on a display of a computer-based system communicatively coupled with a locker, a menu for entering report information pertaining to a problem with the asset; and
in response to receiving the report information, transmitting, to a synchronization system, report data obtained from the report information to cause the synchronization system to:
convert the report data obtained from the report information into manager report data that is in a format that a manager of the synchronization system can process;
store the manager report data in a database in the format that the manager of the synchronization system can process;
determine, based on the report data, instructions for solving the problem;
automatically generate, by the synchronization system, one or more messages and including the instructions for handling the problem with the asset;
automatically transmit the one or more messages, from the synchronization system to a plurality of work order management systems over one or more computer networks, so that each of the work order management systems has access to the one or more messages.

16. The non-transitory computer readable storage media of claim 15, storing additional instructions which, when executed by the one or more processors, cause:
receiving a request for reserving a locker compartment of the plurality of locker compartments for a temporary use; and
wherein the computer-based system accepts, via the display, report information pertaining to a problem with the locker compartment.

17. The non-transitory computer readable storage media of claim 15, wherein the computer-based system is configured as a kiosk; and
wherein the report information is entered via the display of the kiosk.

18. The non-transitory computer readable storage media of claim 17, wherein the report information is entered by selecting, for each question of one or more questions displayed in the display of the kiosk, one or more answers displayed in the display of the kiosk.

19. The non-transitory computer readable storage media of claim 15, wherein the menu is generated using a graphical user interface configured to display a sequence of webpages.

20. The non-transitory computer readable storage media of claim 15, wherein the locker further comprises a locker manager and one or more sensors or one or more cameras implemented in the locker;

wherein the locker manager generates report metadata from the report information received from the computer-based system and transmits the report metadata to the synchronization system; and wherein the locker receives sensor data from one or more sensors or camera data from one or more cameras and transmits the sensor data or the camera data to the locker manager along with the report information.

* * * * *